US012776059B2

(12) United States Patent
Shinobu et al.

(10) Patent No.: US 12,776,059 B2
(45) Date of Patent: Oct. 27, 2026

(54) LINE-OF-SIGHT DETECTING APPARATUS, OBSERVATION APPARATUS, IMAGE PICKUP APPARATUS, CONTROL METHOD, AND STORAGE MEDIUM

(71) Applicant: CANON KABUSHIKI KAISHA, Tokyo (JP)

(72) Inventors: Fumihiro Shinobu, Tochigi (JP); Saki Nakamichi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 18/428,067

(22) Filed: Jan. 31, 2024

(65) Prior Publication Data

US 2024/0265566 A1 Aug. 8, 2024

(30) Foreign Application Priority Data

Feb. 2, 2023 (JP) ................................ 2023-014904

(51) Int. Cl.

| | |
|---|---|
| ***G06T 7/60*** | (2017.01) |
| ***G06T 7/55*** | (2017.01) |
| ***G06T 7/70*** | (2017.01) |

(52) U.S. Cl.

CPC .................. *G06T 7/70* (2017.01); *G06T 7/55* (2017.01); *G06T 7/60* (2013.01); *G06T 2207/30196* (2013.01)

(58) Field of Classification Search

None

See application file for complete search history.

(56) References Cited

U.S. PATENT DOCUMENTS

| | | | | |
|---|---|---|---|---|
| 4,856,997 A * | 8/1989 | Mellecker | .............. | G09B 25/04 359/862 |
| 9,538,913 B2 * | 1/2017 | Yoshida | .................. | A61B 3/14 |

(Continued)

FOREIGN PATENT DOCUMENTS

| | | | |
|---|---|---|---|
| JP | H112755 A | | 1/1999 |
| JP | 2004167152 A | * | 6/2004 |
| WO | 2022038815 A1 | | 2/2022 |

OTHER PUBLICATIONS

STIC provided machine translation of JP2004-167152 A (Year: 2004).*

(Continued)

*Primary Examiner* — Tyler W. Sullivan
(74) *Attorney, Agent, or Firm* — ROSSI, KIMMS & McDOWELL LLP

(57) ABSTRACT

An image pickup apparatus includes an observation apparatus, which includes a line-of-sight detecting apparatus that facilitates a measurement of an eyeball distance. Light sources illuminate an eyeball of a user observing the observation apparatus, from positions different from each other. An image pickup unit captures an image of the eyeball. A processor calculates an eyeball distance from the image pickup unit to the eyeball based on a distance, in the image captured by the image pickup unit, between a first reflected image of the first light source reflected by the eyeball and a second reflected image of the second light source reflected by the eyeball, including using correction information based on positional information on the first reflected image and the second reflected image.

16 Claims, 6 Drawing Sheets

(56) References Cited

U.S. PATENT DOCUMENTS

| | | | | |
|---|---|---|---|---|
| 2022/0172667 | A1* | 6/2022 | Takagi | G02B 27/0172 |
| 2022/0197111 | A1 | 6/2022 | Tanaka | |
| 2022/0277590 | A1 | 9/2022 | Mine et al. | |
| 2023/0181034 | A1 | 6/2023 | Hakoshima | |
| 2025/0221622 | A1* | 7/2025 | Berestka | A61B 3/135 |

OTHER PUBLICATIONS

Communication Pursuant to Article 94(3) EPC issued in European Appln. No. 24 154 382.6 mailed Apr. 4, 2025.

Communication pursuant to Article 94(3) issued in European Patent Application No. 24154382.6 on Sep. 5, 2025.

Extended European Search Report issued in European Appln. No. 24154382.6, mailed May 21, 2024.

Office Action issued in European Appln. No. 24154382.6 mailed on Jun. 19, 2026.

* cited by examiner

LINE-OF-SIGHT DETECTING APPARATUS, OBSERVATION APPARATUS, IMAGE PICKUP APPARATUS, CONTROL METHOD, AND STORAGE MEDIUM

BACKGROUND

Technical Field

One of the aspects of the embodiments relates to a line-of-sight detecting apparatus.

Description of Related Art

A so-called line-of-sight detecting apparatus has conventionally been proposed that detect which position on an observation surface an observer of an optical apparatus is observing.

Japanese Patent Laid-Open No. 11-2755 discloses a corneal reflection method as a method of a line-of-sight detecting apparatus. In the corneal reflection method, an observer's eyeball is imaged while nonvisible light is irradiated to the observer's eyeball, and a gazing point is calculated using a positional relationship between a reflected image of a light source from the eyeball (Purkinje image) and an observer's pupil and distance information to the observer's eyeball. The corneal reflection method uses a plurality of light sources to irradiate the observer's eyeball, and determines the distance to the observer's eyeball using a distance between Purkinje images.

However, in a case where the observer's eyeball is imaged at a large angle from an oblique direction or in a case where the observer's eyeball is imaged from the front using an image pickup optical system with large distortion, the distance to the observer's eyeball cannot be accurately calculated using calculations based on the distance between Purkinje images.

There are methods to reduce errors by performing calibration to adjust for individual differences among observers and environmental errors before performing line-of-sight detection, but in a case where a position of the observer's eyeball changes after the calibration, the accurate distance to the eyeball still cannot be calculated.

SUMMARY

A line-of-sight detecting apparatus according to one aspect of the disclosure includes a plurality of light sources including a first light source and a second light source, and configured to illuminate an eyeball of a user who observes an observation apparatus, from positions different from each other, an image pickup unit configured to capture an image of the eyeball, and a processor configured to calculate an eyeball distance from the image pickup unit to the eyeball based on a distance, in the image captured by the image pickup unit, between a first reflected image of the first light source reflected by the eyeball and a second reflected image of the second light source reflected by the eyeball. The processor is configured to calculate the eyeball distance using correction information based on positional information on the first reflected image and the second reflected image on the image. An observation apparatus and an image pickup apparatus each having the above line-of-sight detecting apparatus also constitute another aspect of the disclosure. A control method corresponding to the above line-of-sight detecting apparatus and a storage medium storing a program that causes a computer to execute the above control method also constitute another aspect of the disclosure.

Further features of the disclosure will become apparent from the following description of embodiments with reference to the attached drawings.

DESCRIPTION OF THE EMBODIMENTS

Figure 1:
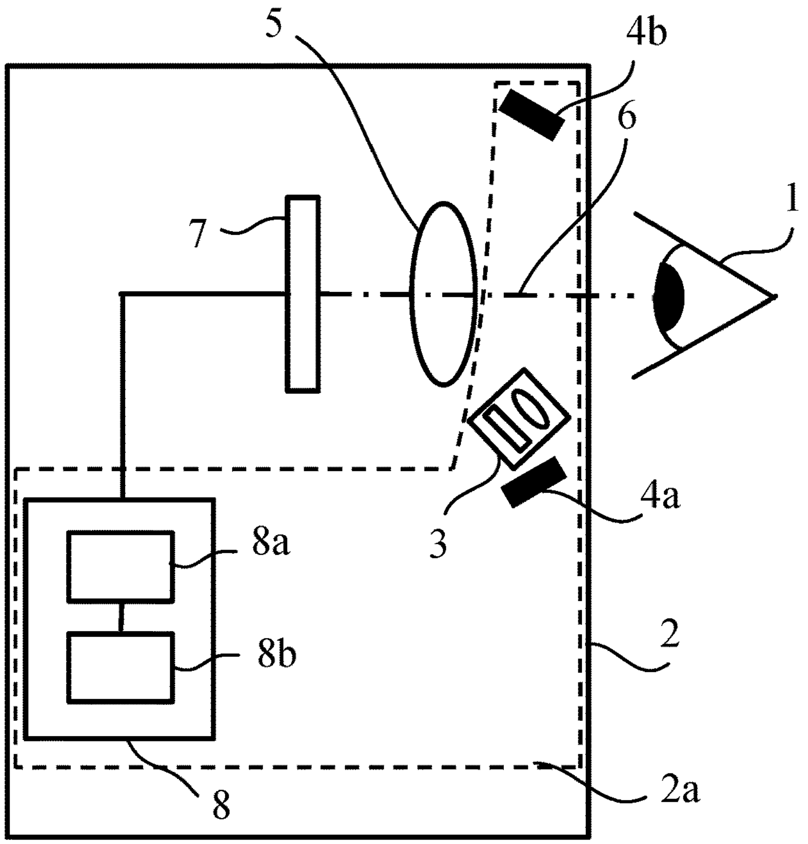
FIG. 1 is a schematic diagram of main parts of an observation apparatus according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

Referring to FIG. 1, an observation apparatus 2 including a line-of-sight detecting apparatus 2*a* according to a first embodiment will be described. FIG. 1 is a schematic diagram of the observation apparatus 2 according to the first embodiment. The observation apparatus 2 includes an image display element 7, an eyepiece optical system 5, an image pickup unit 3, light sources 4*a* and 4*b*, and a distance calculation unit 8. The line-of-sight detecting apparatus 2*a* includes the image pickup unit 3, the light sources 4*a* and 4*b*, and the distance calculation unit 8. The image display element 7 is, for example, a liquid crystal display element, an organic EL display, or the like. The eyepiece optical system 5 guides an image displayed on the image display element 7 to an eyeball 1 of an observer. The image pickup unit 3 includes an image pickup optical system and an image sensor, and captures an image of the eyeball 1 of the observer. The light sources 4*a* and 4*b* (a first light source, a second light source) illuminate the eyeball 1 of the observer who observes the observation apparatus 2 from positions different from each other. The distance calculation unit (a calculation unit) 8 calculates a distance from the image pickup unit 3 to the eyeball 1 of the observer (an eyeball distance) based on a distance between reflected images of the light sources 4*a* and 4*b* reflected by the eyeball 1 in the image captured by the image pickup unit 3.

The image pickup unit 3 is arranged obliquely relative to an optical axis 6 of the eyepiece optical system 5 (an optical axis 6 of the observation apparatus 2). In other words, the optical axis 6 of the eyepiece optical system 5 and an optical axis of the image pickup optical system of the image pickup unit 3 are not parallel to each other. The image pickup unit 3 captures the image of the eyeball 1 of the observer from an oblique direction relative to the optical axis 6 of the eyepiece optical system 5. The light sources 4*a* and 4*b* emit light in an infrared wavelength band so as not to cause discomfort to the observer. The light sources 4*a* and 4*b* are, for example, light emitting diodes that emit infrared light. The distance calculation unit 8 includes a CPU 8*a* which is a central processing unit of a microcomputer that controls the entire observation apparatus 2, and a memory 8*b* that stores an image pickup result of the image pickup unit 3, line-of-sight correction data for correcting individual differences in line of sight, which will be described later, and correction information based on positional information on the image, which will be described later. In this embodiment, the distance calculation unit 8 calculates the distance from the image pickup unit 3 to the eyeball 1 using the correction information based on the positional information on the image.

Next, referring to FIGS. 2-4, an operation of the line-of-sight detection will be explained.

Figure 2:
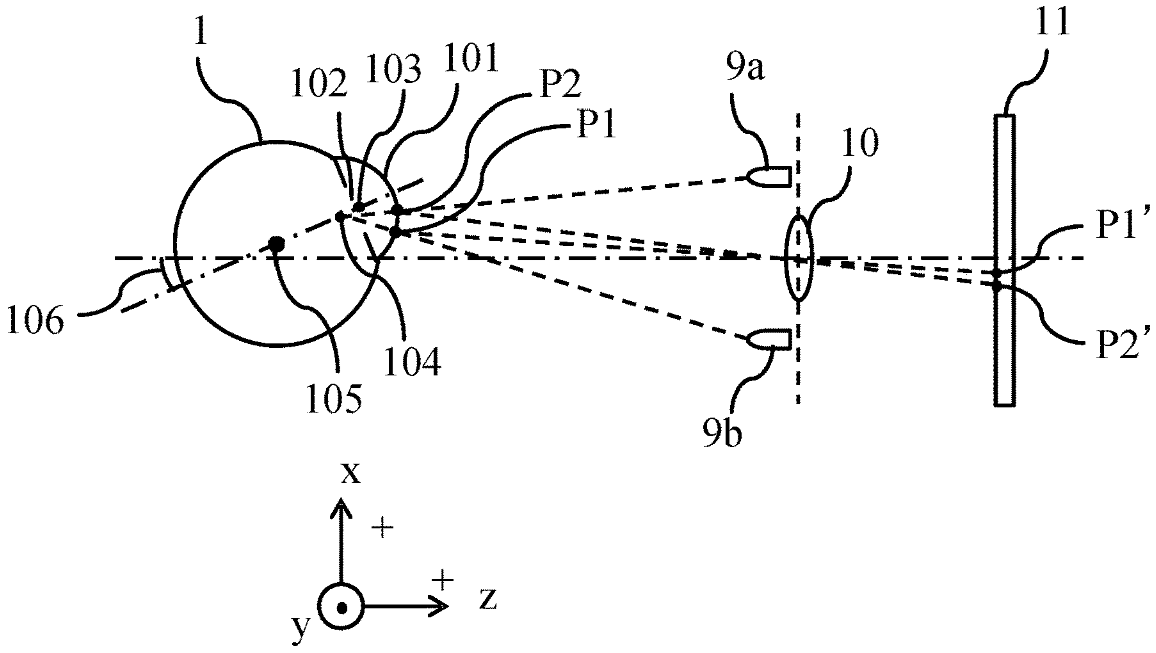
FIG. 2 explains the principle of a line-of-sight detecting method according to the first embodiment.

FIG. 2 explains the principle of the line-of-sight detection. The light sources 9*a* and 9*b* are arranged approximately line-symmetrically with respect to an optical axis of a light-receiving lens 10, and illuminate the eyeball 1 of the observer who observes the observation apparatus 2 from positions different from each other. A part of illumination light emitted from the light sources 9*a* and 9*b* and reflected by the eyeball 1 of the observer is focused by the light-receiving lens 10 onto an image sensor 11 for capturing an image of the eyeball 1. In FIG. 2, the reference numeral 101 denotes a cornea of the eyeball 1 of the observer, the reference numeral 102 denotes a pupil, the reference numeral 103 denotes a center of the pupil 103 (a pupil center), the reference numeral 104 denotes a center of curvature of the cornea 101, the reference numeral 105 denotes a center position of a rotation of the eyeball 1, and the reference numeral 106 denotes a rotation angle of the eyeball 1 relative to the optical axis.

Figure 3A:
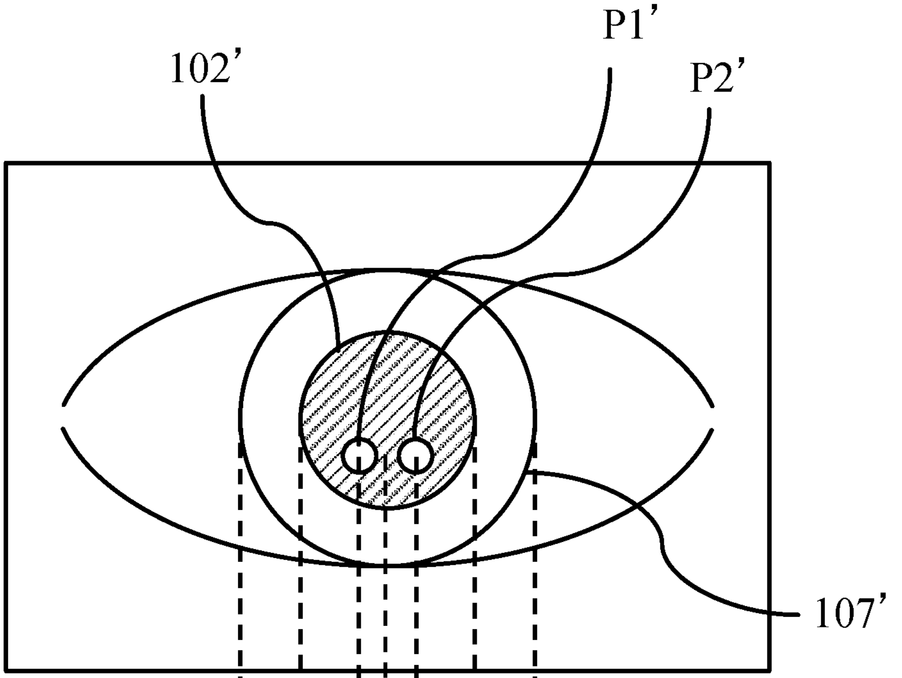
FIGS. 3A and 3B illustrate an example of an eyeball image obtained during the line-of-sight detection.
Figure 3B:
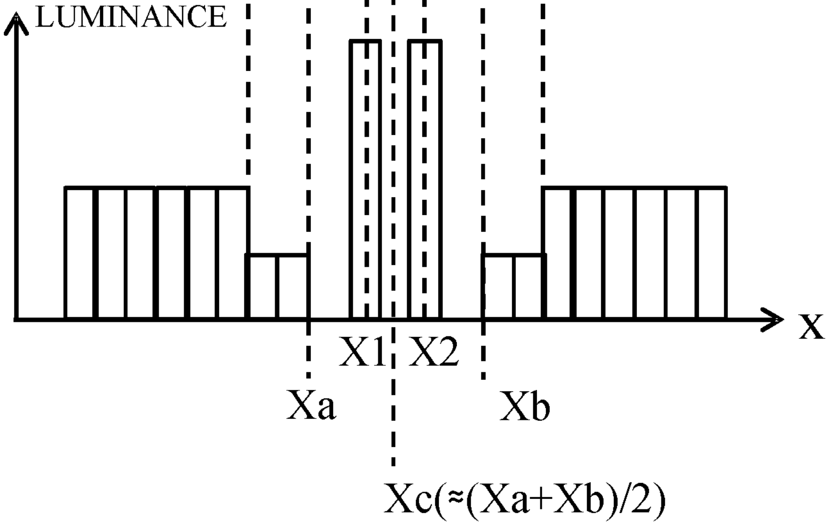

FIG. 3A is a schematic diagram of the image of the eyeball 1 (an eyeball image) captured by the image sensor 11. FIG. 3B is a diagram showing luminance distribution in the eyeball image acquired by the image sensor 11.

Figure 4:
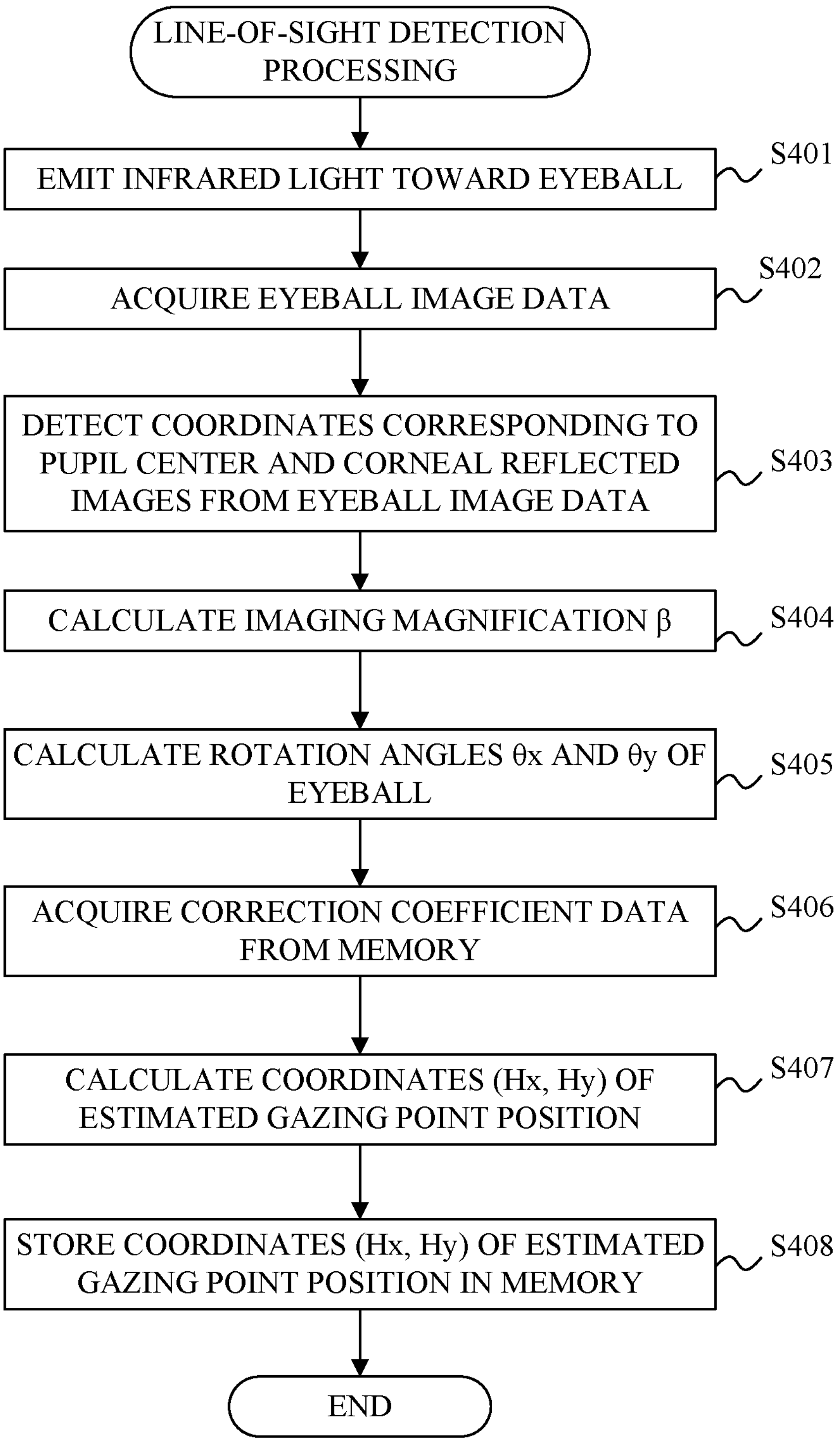
FIG. 4 is a flowchart of line-of-sight detection processing.

FIG. 4 is a flowchart of the line-of-sight detection processing. This processing is executed by the distance calculation unit 8 reading a program recorded in a ROM (not shown in FIG. 1).

In FIG. 4, when the line-of-sight detection processing starts, in step S401, the CPU 8*a* controls the light sources 9*a* and 9*b* to cause the light sources 9*a* and 9*b* to emit infrared light toward the eyeball 1 of the observer. The infrared light reflected by the eyeball 1 of the observer passes through the light-receiving lens 10, forms an image on the image sensor 11, and is photoelectrically converted. Thereby, a processable electrical signal of the eyeball image (eyeball image data) is obtained.

In step S402, the CPU 8*a* acquires eyeball image data obtained from the image sensor 11.

In step S403, the CPU 8*a* detects coordinates corresponding to corneal reflected images P1 and P2 of the light sources 9*a* and 9*b* and a coordinate corresponding to the pupil center 103 from the eyeball image data acquired in the step S402.

The infrared light emitted from the light sources 9*a* and 9*b* illuminates the cornea 101 of the eyeball 1 of the observer. At this time, the corneal reflected images (Purkinje images) P1 and P2 formed by a part of the infrared light reflected on a surface of the cornea 101 are focused by the light-receiving lens 10 and formed on the image sensor 11 to become corneal reflected images P1' and P2'. Similarly, light flux from an end of the pupil 102 also forms an image on the image sensor 11, and a pupil image 102' is formed.

FIG. 3B shows the luminance distribution in the eyeball image of FIG. 3A. In FIG. 3B, a horizontal direction of the eyeball image is an X axis, a vertical direction of the eyeball image is a Y axis, and the luminance distribution in the X axis direction is shown. In this embodiment, the coordinates of the corneal reflected images P1' and P2' in the X axis direction (the horizontal direction) are X1 and X2, and the coordinates of the ends of the pupil image 102' in the X axis direction are Xa and Xb. As shown in FIG. 3B, an extremely high level of luminance is obtained at the coordinates X1 and X2 of the corneal reflected images P1' and P2'. In a range larger than the coordinate Xa and smaller than the coordinate Xb, which corresponds to a region of the pupil 102 (a region of the pupil image 102' obtained when the light flux from the pupil 102 forms an image on the image sensor 11), an extremely low level of luminance is obtained except for the coordinates X1 and X2. On the other hand, in a region 107' of an iris part outside the pupil 102, a luminance intermediate between the above two types of luminance is obtained. Specifically, in a region where the X coordinate (coordinate in the X axis direction) is smaller than the coordinate Xa, and in a region where the X coordinate is larger than the coordinate Xb, a luminance intermediate between the above two types of luminance is obtained.

From the luminance distribution as shown in FIG. 3B, the X coordinates X1 and X2 of the corneal reflected images P1' and P2', and the X coordinates Xa and Xb of the ends of the pupil image 102' can be obtained. Specifically, the coordinates with extremely high luminance can be obtained as the center-of-gravity coordinates of the corneal reflected images P1' and P2', and the coordinates with extremely low luminance can be obtained as the coordinates of the pupil image 102'.

Furthermore, in a case where a rotation angle 106 of the optical axis of the eyeball 1 relative to the optical axis of the light-receiving lens 10 is small, a coordinate Xc of a pupil center image (a center of the pupil image 102') obtained when the light flux from the pupil center 103 forms an image on the image sensor 11 can be expressed as Xc≈(Xa+Xb)/2. In other words, the X coordinate Xc of the pupil center image can be calculated from the X coordinates Xa and Xb of the ends of the pupil image 102'. In this way, the X coordinates (X1, X2) of the corneal reflected images P1' and P2', and the X coordinate (Xc) of the pupil center image can be estimated.

Returning back to FIG. 4, in step S404, the CPU 8*a* calculates an imaging magnification β of the eyeball image. The imaging magnification β is a magnification determined by a position of the eyeball 1 relative to the light-receiving lens 10, and can be determined as a function of a distance in the Z direction from the light-receiving lens 10 to the eyeball 1, a distance between the corneal reflected images P1' and P2' (X1-X2), and a curvature of the cornea 101.

In step S405, the CPU 8*a* calculates the rotation angle of the optical axis of the eyeball 1 relative to the optical axis of the light-receiving lens 10. The X coordinate of the midpoint between the corneal reflected image P1 and the corneal reflected image P2 substantially matches the X coordinate of a center of curvature 104 of the cornea 101. For this reason, when a standard distance between the center of curvature 104 of the cornea 101 and the center 103 of the pupil 102 is Oc, the rotation angle θx of the eyeball 1 in the ZX plane (a plane perpendicular to the Y axis) can be calculated using the following equation (1). The rotation angle θy of the eyeball 1 in the ZY plane (a plane perpendicular to the X axis) can also be calculated in the same manner as the calculation method of the rotation angle θx.

$$\beta * Oc * \sin\theta x \approx \{(X1 + X2)/2\} - Xc \tag{1}$$

In step S406, the CPU 8*a* acquires correction coefficient data (coefficient m and line-of-sight correction coefficients Ax, Bx, Ay, By) from the memory 8*b*. The coefficient m is a constant determined by the configuration of the observation apparatus 2 such as the arrangement of the eyepiece optical system 5 and the light-receiving lens 10, and is a conversion coefficient for converting the rotation angles θx and θy into the coordinate Xc corresponding to the pupil center 103 in a viewing image. The coefficient m is determined in advance and stored in the memory 8*b*. Furthermore, the line-of-sight correction coefficients Ax, Bx, Ay, and By are parameters for correcting individual differences in the eyeball 1, are obtained by performing a calibration work described later, and are stored in the memory 8*b* before the line-of-sight detection processing starts.

In step S407, the CPU 8*a* calculates a position of the observer's viewpoint (an estimated gazing point position (a gazing point direction)). Specifically, the estimated gazing point position is calculated using the rotation angles θx and θy of the eyeball 1 calculated in the step S405 and the correction coefficient data acquired in the step S406. Assuming that the coordinate (Hx, Hy) of the estimated gazing point position is the coordinate corresponding to the pupil center 103, the coordinate (Hx, Hy) of the estimated gazing point position is calculated using the following equations (2) and (3).

$$Hx = m * (Ax * \theta x + Bx) \tag{2}$$

$$Hy = m * (Ay * \theta y + By) \tag{3}$$

In step S408, the CPU 8*a* stores the coordinate (Hx, Hy) of the estimated gazing point position calculated in the step S407 in the memory 8*b*, and ends the processing.

As described above, in the line-of-sight detection processing according to this embodiment, using the rotation angles θx and θy of the eyeball 1, and the correction coefficient data (the coefficient m, and the line-of-sight correction coefficients Ax, Bx, Ay, By), the estimated gazing point position has been calculated.

However, due to factors such as individual differences in a shape of the eyeball 1 of a human, the estimated gazing point position may not be estimated with high accuracy. Therefore, before performing the line-of-sight detection processing for the observer, the CPU 8*a* (a calibration unit) performs the calibration work, acquires the line-of-sight correction coefficients Ax, Ay, Bx, By suitable for the user (the observer), and stores them in the memory 8*b*.

Conventionally, the calibration work has been performed by displaying visual targets at positions such as the top, bottom, left, and right ends of a line-of-sight detection range before the line-of-sight detection processing, and having the observer look at the visual targets. Then, when the observer gazes at each visual target, the line-of-sight detection processing is performed, and a technique for determining the line-of-sight correction coefficients Ax, Ay, Bx, By suitable for the user from the calculated coordinates of a plurality of estimated gazing point positions and the coordinate of each visual target is known as a publicly known technique.

However, in the calculations in the steps S403 to S407, in a case where the image pickup unit 3 is arranged obliquely to the optical axis 6 of the eyepiece optical system 5 as in this embodiment, the estimated gazing point position of the observer can be accurately calculated. Specifically, the acquisition coordinates X1 and X2 of the corneal reflected images P1' and P2' are affected by the eyeball position of the observer. As a result, it becomes difficult to calculate highly accurate results in subsequent calculations.

Figure 5:
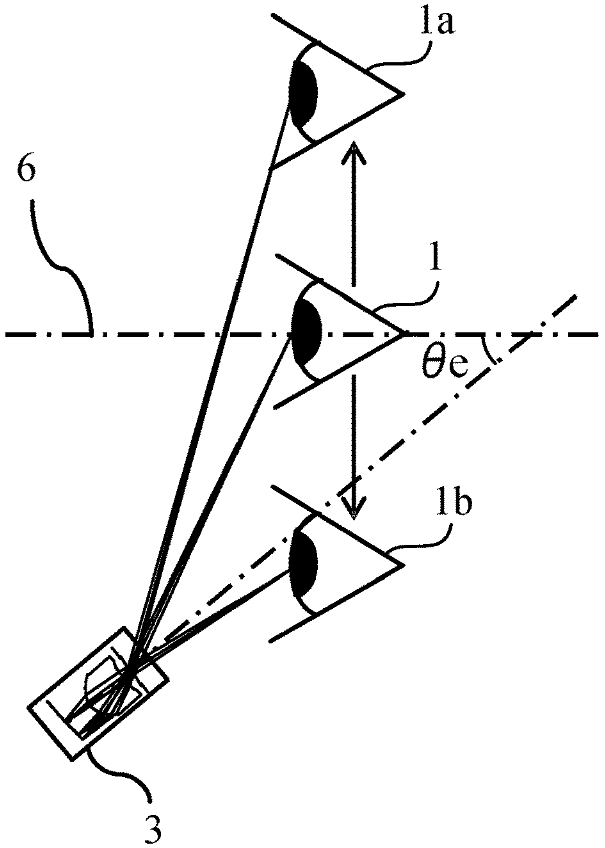
FIG. 5 schematically illustrates changes in an eyeball position during the line-of-sight detection.
Figure 6:
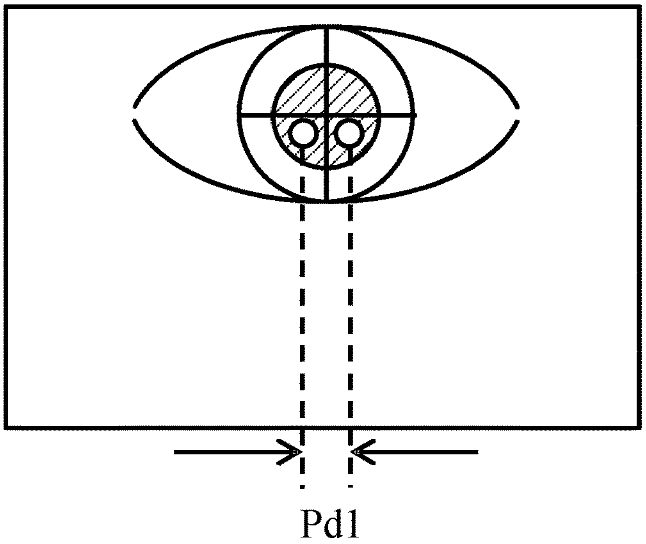
FIG. 6 illustrates an example of an eyeball image obtained during the line-of-sight detection when the eyeball has moved to a position 1*a* in FIG. 5.

FIG. 5 is a schematic diagram in a case where the image pickup unit 3 is arranged at an angle θe inclined to the optical axis 6 of the eyepiece optical system 5. In a case where the image pickup unit 3 is arranged as shown in FIG. 5, when the eyeball 1 of the observer is displaced in the vertical direction relative to the optical axis 6 of the eyepiece optical system 5, a distance relationship between the image pickup unit 3 and the eyeball 1 effectively changes, although a distance between the eyeball 1 and the image pickup unit 3 in the Z direction remains constant. As a result, the distance between the image pickup unit 3 and the eyeball 1 cannot be calculated accurately, and it becomes difficult to accurately calculate the magnification of the image pickup unit 3. For example, in FIG. 5, in a case where the eyeball 1 is placed on the optical axis, the eyeball image captured by the image pickup unit 3 is as shown in FIGS. 3A and 3B. However, in a case where the eyeball 1 is placed at the position 1*a*, the distance between the eyeball 1 and the image pickup unit 3 is substantially increased, so that the eyeball image captured by the image pickup unit 3 becomes as shown in FIG. 6. Similarly, in a case where the eyeball 1 is placed at the position 1*b*, the distance between the eyeball 1 and the image pickup unit 3 is substantially decreased, so that the eyeball image captured by the image pickup unit 3 becomes as shown in FIG. 7.

Figure 7:
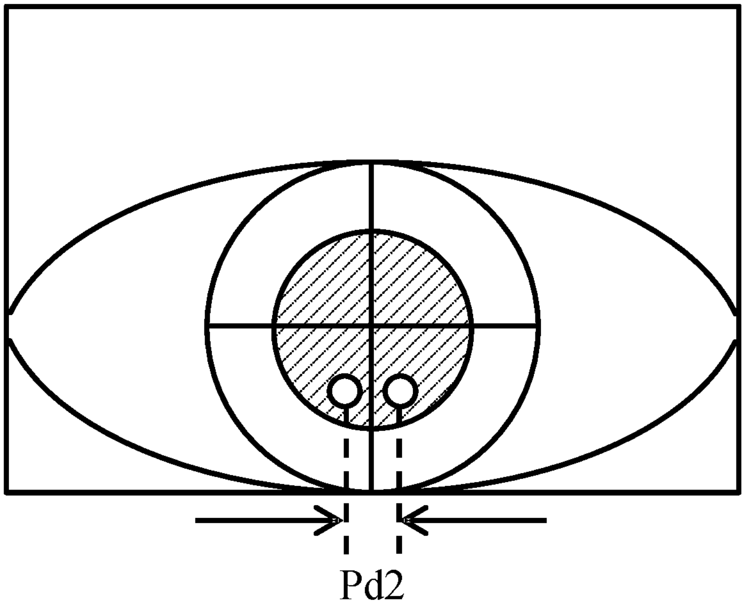
FIG. 7 illustrates an example of an eyeball image obtained during the line-of-sight detection when the eyeball has moved to a position 1*b* in FIG. 5.

When the distances between the corneal reflected images obtained in FIGS. 6 and 7 are respectively Pd1 and Pd2, and if Pd1=Pd2, the calculation results in the steps S403 and S404 in FIG. 4 will be the same in FIGS. 6 and 7. However, as is clear from FIGS. 6 and 7, the magnification of the eyeball 1 of the observer is actually significantly different, which means that the distance to the eyeball 1 of the observer cannot be calculated accurately.

There is a method of adjusting these errors by performing the calibration to improve the accuracy of line-of-sight detection, but in a case where the positional relationship between the eyeball 1 of the observer and the image pickup unit 3 changes, an accurate calculation becomes difficult. This makes it difficult to ensure sufficient line-of-sight detection accuracy.

In order to deal with these problems, in this embodiment, the CPU 8*a* uses correction information based on the positional information on the corneal reflected images P1' and P2' on the image to calculate the distance from the image pickup unit 3 to the eyeball 1 of the observer. Thereafter, the CPU 8*a* corrects the image captured by the image pickup unit 3 based on the calculated distance to the eyeball 1, and calculates the estimated gazing point position of the eyeball 1 by the above described method using the corrected image.

Figure 8:
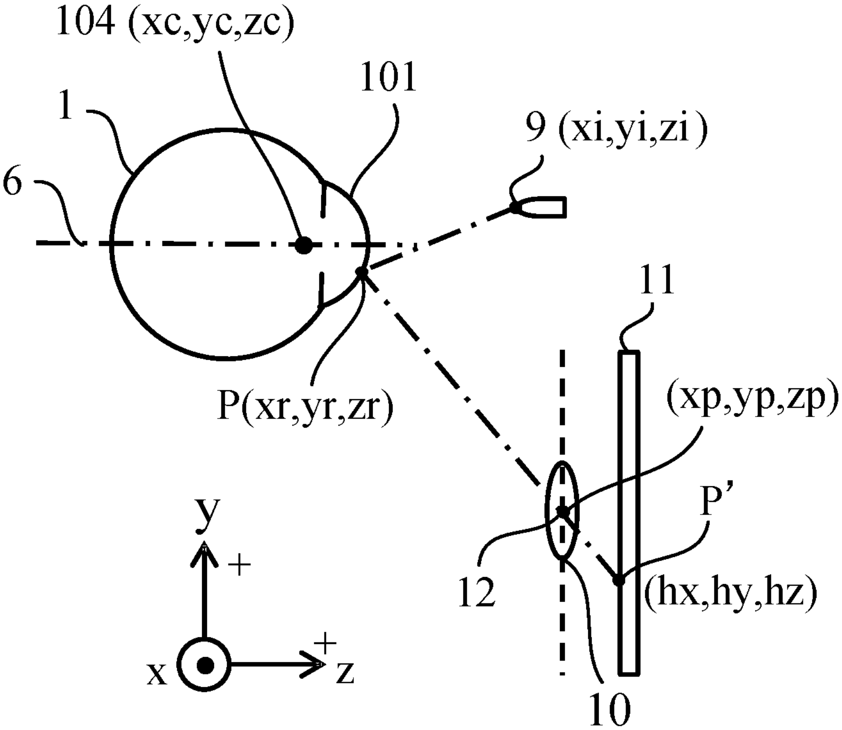
FIG. 8 illustrates an example of an arrangement of a line-of-sight detecting apparatus according to the first embodiment and the observer's eyeball.

The correction information based on the positional information on the corneal reflected images P1' and P2' on the image will be explained in detail using FIG. 8. FIG. 8 shows an example of the arrangement of the line-of-sight detecting apparatus 2*a* and the eyeball 1 of the observer in the correction information on this embodiment. The light source 9 illuminates the eyeball 1 of the observer, and a part of the light flux from the light source 9 is reflected at a position P on the cornea 101, and forms an image by the light-receiving lens 10 at a position P' on the image sensor 11. The light flux from the light source 9 passes through a principal point position 12 of the light-receiving lens 10 and forms an image at position P'. The light-receiving lens 10 is arranged obliquely relative to the optical axis 6 of the observation apparatus 2.

Let the coordinate of the light source 9 be (xi, yi, zi), the coordinate of the principal point position 12 of the light-receiving lens 10 be (xp, yp, zp), the coordinate of the center of curvature 104 of the cornea 101 be (xc, yc, zc), and the radius of the corneal sphere be Rc. At this time, the coordinate (xr, yr, zr) of the reflection point P on the cornea 101 of the light flux emitted from the light source 9 is uniquely determined. Once the coordinate of the reflection point P of the cornea 101 is obtained, the coordinate (hx, hy, hz) of the reflected image P' of the light source 9 formed on the image sensor 11 can be obtained from the relationship with the principal point position 12 of the light-receiving lens 10.

Direct calculation of the coordinate of the reflection point P becomes very complicated. For this reason, a calculation is performed after setting multiple positional relationships between the position of the eyeball 1 and the image pickup unit 3 in advance, the calculation result is retained in the memory 8*b* as the correction information, and a correction is made to the coordinate (hx, hy, hz) of the reflected image P' of the light source 9 using the correction information. the correction information may be based on at least one of the following for accuracy: the distance between the corneal reflected images (X1-X2), the center-of-gravity coordinates of the corneal reflected images (center-of-gravity positions), the previously calculated positional relationship between the eyeball 1 and the image pickup unit 3, the radius of curvature Rc of the cornea 101, and the radius of curvature of the eyeball 1. The correction information may be based on the center-of-gravity coordinates of the corneal reflected images and the distance between the corneal reflected images (X1-X2), and the correction information may be based on the previously calculated positional relationship between the eyeball 1 and the image pickup unit 3 and the radius of curvature of the eyeball 1. At this time, the radius of curvature Rc of the cornea 101 may be a fixed value or may be a curvature obtained by other means.

In the line-of-sight detecting apparatus according to this example, the tilt angle θe of the optical axis of the image pickup unit 3 relative to the optical axis 6 of the observation optical system may satisfy the following inequality (4).

$$20° < \theta e < 70° \qquad (4)$$

In a case where the value becomes lower than the lower limit of the inequality (4), a certain level of line-of-sight detection accuracy can be obtained even without the correction information as in this embodiment. For this reason, having the correction information as in this embodiment unnecessarily burdens the CPU 8*a* and the memory 8*b*. In a case where the value becomes larger than the upper limit of the inequality (4), it becomes difficult for the image pickup unit 3 to obtain the corneal reflected image from the light source 9 due to the eyelids of the observer, and it has an adverse effect on the accuracy of line-of-sight detection.

Furthermore, in this embodiment, the light source 9 that emits infrared light has been described, but when the wavelength of the light source 9 that irradiates the eyeball 1 of the observer is λ, the light source 9 may satisfy the following inequality (5).

$$800\text{ nm} < \lambda < 1600\text{ nm} \qquad (5)$$

In a case where the value becomes lower than the lower limit of the inequality (5), it is undesirable because it is more likely to be visible to the observer and thus causes discomfort to the observer. In a case where the value becomes larger than the upper limit of the inequality (5), light is absorbed in a plastic material used for the eyepiece optical system 5 and glasses of the observer, which is undesirable.

In this embodiment, the memory 8*b* holds the correction information based on the positional information on the corneal reflected images P1' and P2' on the image. This enables accurate calculation of the distance to the eyeball 1 of the observer and provides the highly accurate line-of-sight detecting apparatus, even in a case where the distance (X1-X2) between the corneal reflected images P1' and P2' changes due to positional movement of the eyeball 1 in a direction perpendicular to the optical axis 6 of the observation apparatus 2.

As explained above, this embodiment describes the case in which the image pickup unit 3 and the light-receiving lens 10 are arranged obliquely to the optical axis 6 of the observation apparatus 2, but this embodiment is not limited to this case. For example, the distance (X1-X2) between the corneal reflected images P1' and P2' changes depending on positions of the corneal reflected images P1' and P2' on the image, even in a case where the distortion of the image pickup unit 3 is large. Even in such a case, if the correction information in this embodiment is retained, the highly accurate line-of-sight detecting apparatus can be provided.

In this embodiment, an example in which the distance to the eyeball 1 is calculated only once has been described. In a line-of-sight detection in VR, etc., the position of the eyeball 1 of the observer is basically fixed. For this reason, first, the distance between the corneal reflected images is corrected using the correction information based on the positional information on the image, and thus the distance to the eyeball 1 can be calculated. However, in a case where the position of the observer's eye changes, it is necessary to correct the distance between the corneal reflected images in real time and calculate the distance to the eyeball 1 before performing the line-of-sight detection. In this case, the CPU 8*a* may correct the distance between the corneal reflected images at a predetermined time interval to calculate the distance to the eyeball 1, correct the image captured by the image pickup unit 3 based on the calculated distance to the eyeball 1, and use the corrected image to calculate the estimated gazing point position of the eyeball 1 in the above manner.

Second Embodiment

In the first embodiment, an embodiment has been shown in which the highly accurate line-of-sight detection can be performed by holding the correction information based on the positional information on the image. In this embodiment, an embodiment for providing a more accurate line-of-sight detection function will be described.

In the first embodiment, an example has been shown in which the distance to the eyeball 1 of the observer is calculated based on the position and distance of the corneal reflected images P1' and P2'. However, in reality, there is a possibility that the calculation of the distance to the eyeball 1 of the observer will also include errors due to an effect of various errors. In such a case, in order to further improve an accuracy, it is effective to increase the number of the light sources 9 and calculate the distance to the eyeball 1 of the observer by combining the plurality of light sources.

Figure 9:
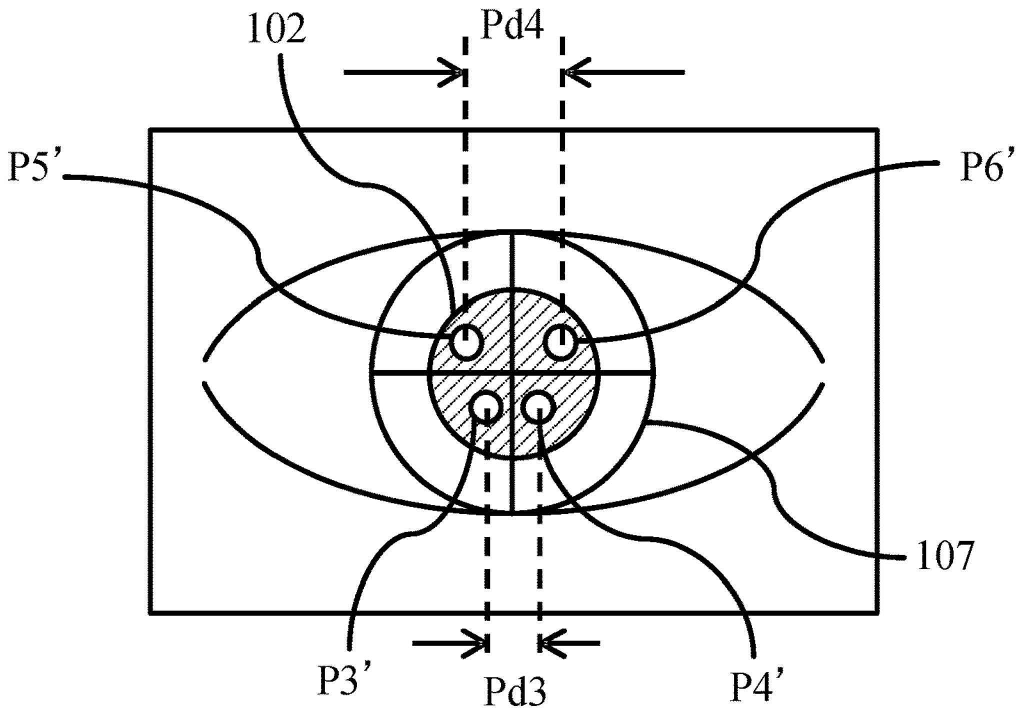
FIG. 9 illustrates an example of an eyeball image obtained during line-of-sight detection according to a second embodiment.

FIG. 9 illustrates an example of the eyeball image obtained during the line-of-sight detection in a case where there are four light sources 9. P3', P4', P5', and P6' are images in which the light fluxes from the light sources 9 are reflected at the position P of the cornea 101 and formed on the image sensor 11 by the light-receiving lens 10. In such a case, for example, a distance Pd3 between P3' and P4' and a distance Pd4 between P5' and P6' are obtained. Error factors that impair the accuracy of the line-of-sight detection are largely due to mechanical arrangement, and therefore often occur at a constant rate regardless of the distance between the corneal reflected images. Therefore, in a case where the eyeball image as shown in FIG. 9 is acquired, the distance to the eyeball 1 may be calculated using the distance Pd4, which is a wider distance between the light sources. In this way, by preferentially using the wider distance of the plurality of distances to calculate the distance to the eyeball 1, it is more likely that the observer's gazing point direction can be calculated with high accuracy. For example, the distance to the eyeball 1 may be calculated using the plurality of distances in descending order of distance.

Although only the light source distances Pd3 and Pd4 are illustrated in FIG. 9, the calculation of the distance to the eyeball 1 may be performed using a combination of the corneal reflected images P3' and P6' where the distance is maximum, or any other combination. In a case where the plurality of light source distances are obtained, they may be weighted and used to calculate the distance to the eyeball 1. The weighting may be performed based on reliability of the plurality of light source distances. Specifically, the higher the reliability, the greater the weighting may be applied to the light source distance.

As described above, this embodiment shows a case where the distance to the eyeball 1 can be calculated with high accuracy by increasing the number of the light sources 9 and using the distances of the plurality of corneal reflected images.

Third Embodiment

Figure 10:
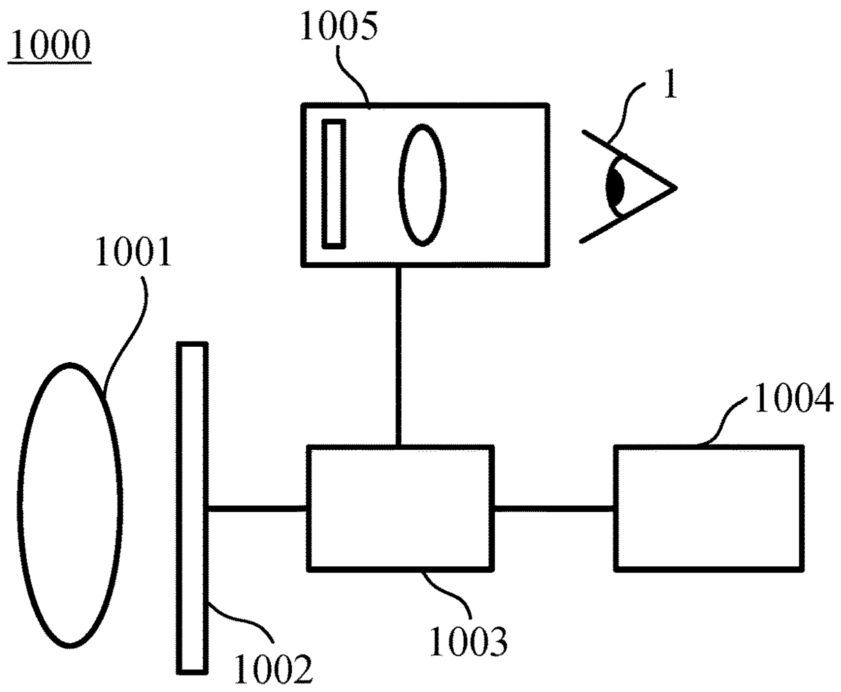
FIG. 10 schematically illustrates main parts of an image pickup apparatus.

Next, an embodiment according to an image pickup apparatus 1000 using the observation apparatus 2 shown in each embodiment will be described with reference to FIG. 10. FIG. 10 is a schematic diagram of main parts of the image pickup apparatus 1000 including the observation apparatus 2 according to each embodiment. An object image formed by an image pickup optical system 1001 is converted into an electrical signal by an image sensor 1002, which is a photoelectric conversion element. As the image sensor 1002, a CCD sensor, a CMOS sensor, or the like is used.

An output signal from the image sensor 1002 is processed in an image processing circuit 1003 to form an image. The formed image is recorded on a recording medium 1004 such as a semiconductor memory, a magnetic tape, or an optical disk. Further, the image formed in the image processing circuit 1003 is displayed on an observation apparatus 1005, which is the observation apparatus according to each embodiment.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide a line-of-sight detecting apparatus that has high detection accuracy by accurately calculating the distance to the observer's eyeball even if the position of the observer's eyeball changes.

This application claims priority to Japanese Patent Application No. 2023-014904, which was filed on Feb. 2, 2023, and which is hereby incorporated by reference herein in its entirety.

What is claimed is:

1. A line-of-sight detecting apparatus comprising:

a plurality of light sources including a first light source and a second light source, and configured to illuminate an eyeball of a user who observes an observation apparatus, from positions different from each other;

an image pickup unit including an image sensor, and configured to capture an image of the eyeball; and a processor configured to calculate an eyeball distance from the image pickup unit to the eyeball based on a distance, in the image captured by the image pickup unit, between a first reflected image of the first light source reflected by the eyeball and a second reflected image of the second light source reflected by the eyeball, wherein the processor is configured to calculate the eyeball distance using correction information based on positional information on the first reflected image and the second reflected image on the image, wherein the correction information includes a first correction amount in a first direction of a vertical component with respect to a center of the image captured by the imaging unit, and a second correction amount in a second direction opposite to the first direction, and wherein the first correction amount and the second correction amount are different from each other.

2. The line-of-sight detecting apparatus according to claim 1, wherein the image pickup unit captures the image from an oblique direction relative to an optical axis of the observation apparatus.

3. The line-of-sight detecting apparatus according to claim 2, wherein the following inequality is satisfied:

$$20° < \theta e < 70°,$$

where θe is a tilt angle of an optical axis of the image pickup unit relative to the optical axis of the observation apparatus.

4. The line-of-sight detecting apparatus according to claim 1, wherein the correction information is based on at least one of:

a center-of-gravity coordinate of a plurality of reflected images of the plurality of light sources reflected by the eyeball in the image, a distance between the plurality of reflected images in the image, a previously calculated positional relationship between a position of the eyeball and the image pickup unit, or a radius of curvature of the eyeball.

5. The line-of-sight detecting apparatus according to claim 1, wherein the correction information is based on:

a center-of-gravity coordinate of a plurality of reflected images of the plurality of light sources reflected by the eyeball in the image, and a distance between the plurality of reflected images in the image.

6. The line-of-sight detecting apparatus according to claim 1, wherein the correction information is based on a previously calculated positional relationship between a position of the eyeball and the image pickup unit, and a radius of curvature of the eyeball.

7. The line-of-sight detecting apparatus according to claim 1, wherein the processor is configured to weight a plurality of distances between reflected images obtained from a plurality of reflected images of the plurality of light sources reflected by the eyeball.

8. The line-of-sight detecting apparatus according to claim 7, wherein the processor is configured to weight the plurality of distances based on reliability of the plurality of distances.

9. The line-of-sight detecting apparatus according to claim 1, wherein the processor is configured to preferentially use a wide distance among a plurality of distances between reflected images obtained from a plurality of reflected images of the plurality of light sources reflected by the eyeball.

10. The line-of-sight detecting apparatus according to claim 1, wherein the processor is configured to use a maximum distance among a plurality of distances between reflected images obtained from a plurality of reflected images of the plurality of light sources reflected by the eyeball.

11. The line-of-sight detecting apparatus according to claim 1, wherein the processor is configured to calculate the eyeball distance at a predetermined time interval, correct the image captured by the image pickup unit based on the calculated eyeball distance, and calculate a gazing point direction of the eyeball of the user using the corrected image.

12. The line-of-sight detecting apparatus according to claim 1, wherein the following inequality is satisfied:

$$800 \text{ nm} < \lambda < 1600 \text{ nm},$$

where λ is a wavelength of each of the plurality of light sources that illuminate the eyeball.

13. The line-of-sight detecting apparatus according to claim 1, wherein the processor is configured to correct the distance between the first reflected image of the first light source reflected by the eyeball and the second reflected image of the second light source reflected by the eyeball, using the correction information.

14. The line-of-sight detecting apparatus according to claim 1, further comprising a memory storing the correction information.

15. An observation apparatus comprising:

an image display element; and a line-of-sight detecting apparatus for observing an image displayed on the image display element, wherein the line-of-sight detecting apparatus comprises:

a plurality of light sources including a first light source and a second light source, and configured to illuminate an eyeball of a user who observes an observation apparatus, from positions different from each other;

an image pickup unit including an image sensor, and configured to capture an image of the eyeball; and a processor configured to calculate an eyeball distance from the image pickup unit to the eyeball based on a distance, in the image captured by the image pickup unit, between a first reflected image of the first light source reflected by the eyeball and a second reflected image of the second light source reflected by the eyeball, wherein the processor is configured to calculate the eyeball distance using correction information based on positional information on the first reflected image and the second reflected image on the image, wherein the correction information includes a first correction amount in a first direction of a vertical component with respect to a center of the image captured by the imaging unit and a second correction amount in a second direction opposite to the first direction, and wherein the first correction amount and the second correction amount are different from each other.

16. An image pickup apparatus comprising:

an image pickup optical system;

a first image sensor configured to capture an object image formed via the image pickup optical system; and an observation apparatus comprising:

an image display element; and a line-of-sight detecting apparatus for observing an image displayed on the image display element, wherein the line-of-sight detecting apparatus comprises:

a plurality of light sources including a first light source and a second light source, and configured to illuminate an eyeball of a user who observes an observation apparatus, from positions different from each other;

an image pickup unit including a second image sensor, and configured to capture an image of the eyeball; and a processor configured to calculate an eyeball distance from the image pickup unit to the eyeball based on a distance, in the image captured by the image pickup unit, between a first reflected image of the first light source reflected by the eyeball and a second reflected image of the second light source reflected by the eyeball, wherein the processor is configured to calculate the eyeball distance using correction information based on positional information on the first reflected image and the second reflected image on the image, wherein the correction information includes a first correction amount in a first direction of a vertical component with respect to a center of the image captured by the imaging unit and a second correction amount in a second direction opposite to the first direction, and wherein the first correction amount and the second correction amount are different from each other.

* * * * *